United States Patent [19]
Ladd

[11] 3,915,997

[45] Oct. 28, 1975

[54] METHOD FOR MAKING MESO-1,2,3,4-BUTANETETRACARBOXYLIC DIANHYDRIDE

[75] Inventor: John R. Ladd, Ballston Lake, N.Y.

[73] Assignee: General Electric Company, Schenectady, N.Y.

[22] Filed: Dec. 25, 1973

[21] Appl. No.: 428,420

[52] U.S. Cl. .............................................. 260/346.8
[51] Int. Cl.² ...................................... C07D 307/16
[58] Field of Search ................................. 260/346.8

[56] References Cited
OTHER PUBLICATIONS

Minami et al.; Chem. Abst., vol. 75, item 98184 (1971).

*Primary Examiner*—Harry I. Moatz
*Attorney, Agent, or Firm*—William A. Teoli; Joseph T. Cohen; Jerome C. Squillaro

[57] ABSTRACT

A method is provided for making meso-1,2,3,4-butanetetracarboxylic dianhydride. There is employed an ether containing solvent mixture to effect the formation and separation of the pure dianhydride at high yields from the meso-1,2,3,4-butanetetracarboxylic acid precursor.

4 Claims, No Drawings

METHOD FOR MAKING MESO-1,2,3,4-BUTANETETRACARBOXYLIC DIANHYDRIDE

The present invention relates to a method for making meso-1,2,3,4-butanetetracarboxylic dianhydride from the precursor meso-1,2,3,4-butanetetracarboxylic acid.

Meso-1,2,3,4-butanetetracarboxylic dianhydride of the formula, (I) 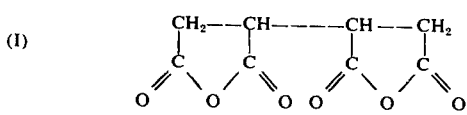

is a valuable intermediate which can be used to prepare a wide variety of polymeric materials, plasticizers, lubricants, etc. Prior to the present invention, methods were available as shown, for example, by J. W. Lynn and R. L. Roberts (*J. Am. Chem. Soc.* 26 4303 [1961]) for preparing the corresponding tetracarboxylic acid precursor. For example, as shown by the following equation,

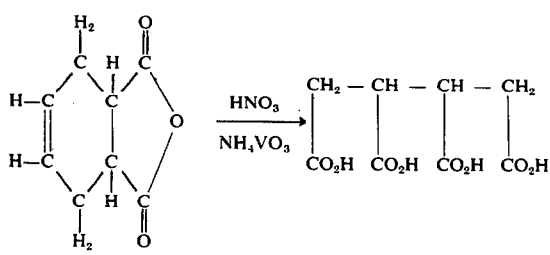

cis-1,2,3,6-tetrahydrophthalic anhydride can be oxidized to meso-1,2,3,4-butanetetracarboxylic acid with nitric acid in the presence of ammonium vanadate.

It is generally recognized by those skilled in the art, that the above meso-1,2,3,4-butanetetracarboxylic acid is less effective for preparing polyesters and polyamides than the corresponding dianhydride. However, attempts to prepare the dianhydride of formula I from the tetracarboxylic acid precursor resulted in either low yields of the desired product, or dark by-products which were often difficult to separate from the reaction mixture.

The present invention is based on the discovery that if at least a stoichiometric amount of acetic anhydride is added with stirring to an ether solution of the meso-1,2,3,4-butanetetracarboxylic acid, quantitative yields of the pure dianhydride of formula I can be obtained.

There is provided by the present invention, a method for making meso-1,2,3,4-butanetetracarboxylic dianhydride of formula I which comprises
1. dissolving meso-1,2,3,4-butanetetracarboxylic acid in an ether solvent,
2. mixing the resulting solution of (1) with at least a stoichiometric amount of acetic anhydride, and
3. recovering from (2), the dianhydride of formula (1).

In the practice of the invention, meso-1,2,3,4-butanetetracarboxylic acid, or "tetra-acid" is dissolved in an appropriate ether. Suitable ethers include, for example, tetrahydroforan, dioxane, diglyme etc. However, any ether can be used which satisfactorily dissolves the tetra-acid and which the dianhydride of formula I is relatively insoluble.

There can be added to the tetra-acid solution, at least a stoichiometric amount of an aliphatic acid anhydride. A stoichiometric amount is that amount which is at least sufficient to react with the theoretical water of condensation upon conversion of the tetra-acid to the dianhydride. Amounts of aliphatic acid anhydride above such stoichiometric levels, even considerable excesses, also can be employed without interferring with the results desired.

Temperatures in the range of between 0°C to 50°C can be used after the acetic anhydride is added to the solution of the tetra-acid to facilitate formation of product. Agitation, such as stirring of the ingredients also can be used to improve dianhydride formation. Reaction times of from 1 to 5 hours more or less will not be unusual.

The dianhydride can be recovered from the mixture by standard technique such as filtering, centrifuging, etc.

In order that those skilled in the art will be better able to practice the invention, the following example is given by way of illustration and not by way of limitation. All parts are by weight.

EXAMPLE

A solution was made by stirring 417 parts of crude meso-1,2,3,4-butanetetracarboxylic acid, obtained by oxidizing 1,2,3,6-tetrahydrophthalic anhydride with nitric acid, in about 2,000 parts of tetrahydrofuran. The solution was then filtered. There was added to the solution with stirring 400 parts of acetic anhydride at about 25°C. The solution was stirred for four hours. During this time meso-1,2,3,4-butanetetracarboxylic dianhydride continuously precipitated. There was obtained 275 parts of product having a decomposition point of 248°–249°C. Based on method of preparation and its IR spectra, the product was meso-1,2,3,4-butanetetracarboxylic dianhydride.

The above procedure was repeated, except dioxane and diglyme were respectively substituted for tetrahydrofuran. Similar results were obtained.

Although the above example is limited to only a few of the very many variables which can be used in the practice of the method of the invention, it should be understood that the present invention can be practiced with the other equivalents shown in the description preceding this example. For example, propionic anhydride can be substituted for acetic anhydride.

What I claim as new and desire to secure by Letters Patent of the United States is:
1. A method for making meso-1,2,3,4-butanetetracarboxylic dianhydride which comprises
   1. dissolving meso-1,2,3,4-butanetetracarboxylic acid in an ether solvent,
   2. mixing the resulting solution of (1) at a temperature in the range of between 0°C to 50°C with at least a stoichiometric amount of an aliphatic acid anhydride, and
   3. recovering from (2) meso-1,2,3,4-butanetetracarboxylic dianhydride.
2. Method in accordance with claim 1, using tetrahydrofuran as the ether solvent.
3. Method in accordance with claim 1, using dioxane as the ether solvent.
4. Method in accordance with claim 1, using diglyme as the ether solvent.

* * * * *